United States Patent [19]

Jones

[11] 4,112,849

[45] Sep. 12, 1978

[54] SMOKELESS SLOW BURNING CAST PROPELLANT

[75] Inventor: John Leslie Jones, Los Angeles, Calif.

[73] Assignee: California Institute Research Foundation, Pasadena, Calif.

[21] Appl. No.: 75,755

[22] Filed: Feb. 11, 1949

[51] Int. Cl.² .................. F42B 1/00; F42B 33/10; C06B 45/10; C06B 21/00
[52] U.S. Cl. .................. 102/103; 86/1 R; 149/19.1; 149/19.91; 149/20; 264/3 R
[58] Field of Search .............. 102/49, 98, 39, 103; 149/19.1, 19.91, 20; 264/3 R; 86/1 R

[56] References Cited

U.S. PATENT DOCUMENTS 2,159,234  5/1939  Taylor ........................................ 52/14

Primary Examiner—Verlin R. Pendegrass
Attorney, Agent, or Firm—Lyon & Lyon

EXEMPLARY CLAIM

1. A cast, combustible composition comprising: granular ammonium nitrate; catalytic amounts of a powdered combustion catalyst intimately mixed with the ammonium nitrate, said catalyst being selected from the group consisting of zirconium hydride, cobalt, nickel, alloys of cobalt, nickel, and zirconium, and the oxides of cobalt and nickel; and an elastic, combustible, crosslinked, resinous fuel consisting of a copolymer which is preponderantly methyl acrylate in sufficient amount to fill the voids between the granules of ammonium nitrate and catalyst.

10 Claims, 3 Drawing Figures

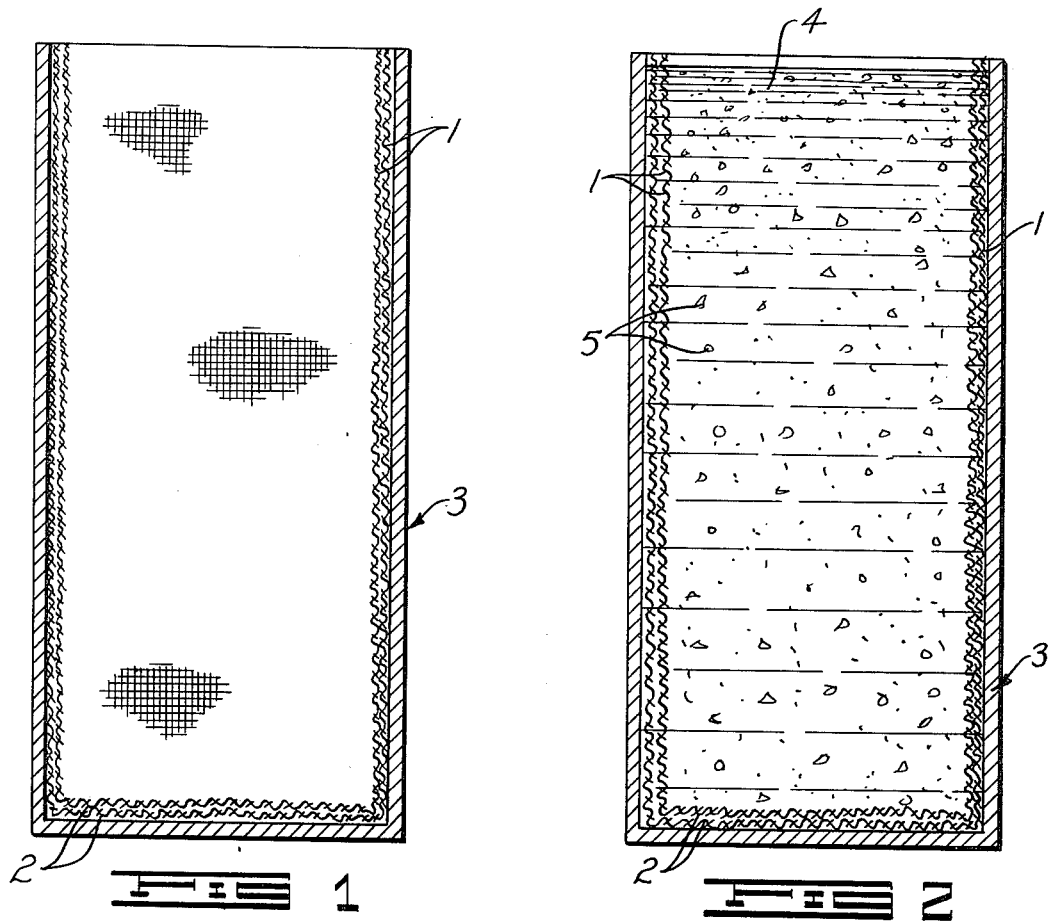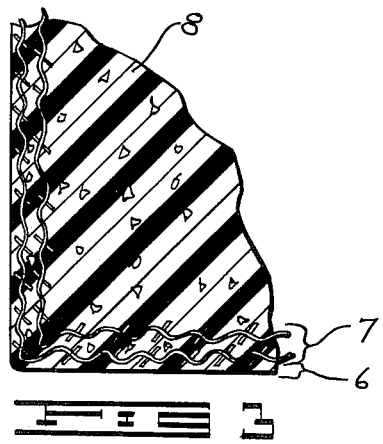

SMOKELESS SLOW BURNING CAST PROPELLANT

This invention relates to improvements in smokeless combustible products suitable for use in jet propulsion motors, gas turbines, and similar devices.

A solid combustible composition suitable for use in jet propulsion motors, gas turbines, and similar devices should be a slowly combustible material, whose rate of oxidation is slow compared to an explosion. All of the oxygen necessary for the combustion should be contained within the solid composition. It is well established that ammonium nitrate is useful as an explosive, when the detonation is initiated by a high velocity booster explosive. Much effort has been expended by many inventors to utilize ammonium nitrate as an oxidizer in solid propellant compositions suitable for jet propulsion devices. Previously disclosed compositions containing ammonium nitrate as the sole oxidizer, in combination with a fuel, have failed to burn in a sustained and reproducible manner. Previously disclosed compositions containing ammonium nitrate as the sole oxidizer, or as a substantial percentage of the total oxidizer have cracked on exposure to successively varying temperatures. This cracking phenomenon is due to the crystalline volume transitions of ammonium nitrate, which occur at $-18°$, $32.3°$, $84.2°$, $125°$, and $169°$ C.

The art of producing compact solid combustible compositions by the extrusion or pressing of gelatinized nitrocellulose is well known. The production of compact solid propellant compositions without elaborate and expensive equipment is very desirable.

An object of this invention is to provide a smokeless solid propellant for jet propulsion motors, gas turbines and similar reaction devices.

A second object of the invention is to devise oxidizers for compact solid combustible compositions.

A third object of this invention is to provide a properly catalyzed ammonium nitrate oxidizer for solid propellants.

A fourth object of this invention is to provide a method of casting compact solid propellants.

Another object of this invention is to provide a solid propellant which can be used over a wide range of temperature conditions.

A further object of this invention is to provide a technique for properly restricting surfaces of the propellant at which ignition should not occur.

Other objects of this invention will become apparent in the following description which is to be read in connection with the appended drawings, in which:

FIG. 1 is a diagrammatical sectional view of a mold and liner therein;

FIG. 2 is a similar view showing a liquid resin and oxidizer added; and

FIG. 3 is an enlarged fragmentary sectional view of a propellant charge produced by my method.

In my invention ammonium nitrate is thoroughly mixed with a catalyst in the desired proportion and combined with the necessary amount of resin forming fuel composition. After polymerization of the resin former, the casting is an elastic, nonporous solid, capable of withstanding rapid temperature changes without cracking. The solid propellant charge can be burned in a jet motor chamber at a controlled and reproducible rate, without detonating.

I have found a class of catalysts useful in increasing the rate of combustion of the resinous fuel by the ammonium nitrate. This class of catalysts comprises powdered cobalt metal, nickel metal, zirconium hydride, cobalt oxides and nickel oxides, and alloys of cobalt, nickel and zirconium.

EXAMPLE I

A typical preparation of the cast propellant containing ammonium nitrate as the oxidizer is as follows: 584 gm of ammonium nitrate and 16 gm powdered cobalt metal catalyst were tumbled in a closed container at about 40 rpm for 2 hours to mix them thoroughly. The dry powder was added slowly to an approximately equal weight of the resin former solution already in the mold and was then stirred. A thin slurry was formed which readily lost its occluded air after further stirring for about 5 minutes. The slurry was allowed to settle for a few minutes, and the excess resin former solution was removed with a filter leaf. After removal of the supernatant liquid, there was a tendency for the filter leaf to remove an excess of monomer from the top of the casting. When the mold was repeatedly pounded on a rubber pad, the liquid again flowed to the top of the charge, as a result of capillary action, and was removed by suction. Several short pounding periods, each followed by filtering of the supernatant liquid, was required to reduce the monomer content to the desired value of about 23 weight percent, i.e., 179 gm. The covered mold was then heated at $50°$ C. in a water bath for 40 hours. The greater part of the polymerization took place in a few hours, after an induction period.

The resin former solution consisted of 80 parts monomeric methyl acrylate, 10 parts monomeric diallyl maleate, and 10 parts maleic anhydride, catalyzed by 0.5 parts t-butyl hydroperoxide. A pure methyl acrylate polymer is elastic and thermoplastic, readily cold-flowing. On adding a crosslinking agent in relatively small amounts, such as diallyl maleate, the resulting polymer is still elastic, but like vulcanized rubber it no longer cold-flows.

The maleic anhydride is added to the system containing methyl acrylate to repress a slight decomposition of the acrylate which takes place in the presence of the cobalt. Alternatively, acid ranging in strength from acetic acid to oxalic acid may be used. Maleic anhydride is preferred because it copolymerizes with the other monomers, becoming a part of the resin phase.

The resin formed in situ during the curing of the propellant serves as a mechanical binder and as fuel for the oxidizer. An elastic resin is necessary to permit the crystal volume changes to occur without developing large strains in the casting. It is also desirable to have an elastic resin to minimize cracks that may be caused by launching shock and mechanical abuse of the propellant charge. The viscosity of the resin former should be sufficiently low to permit rapid escape of the air bubbles formed on pouring the solid into the solution. This important factor must not be overlooked, if the castings are to be free of voids. All the common liquid resin monomers have sufficiently low viscosities to permit rapid settling of the solid particles. A low-viscosity monomer solution also minimizes the difficulty of filtering off the excess monomer.

Essentially the process of preparing the casting consists of filling the voids between the crystals of oxidizer with fluid resin former, then polymerizing the liquid to an elastic resin, thus encasing every crystal with an elastic sheath. Crystal volume changes can then occur without rupturing the resinous fuel bonding phase.

Other resins may be employed as binder and fuel for the oxidizer. For example, butyl methacrylate, vinyl acetate, styrene, and methyl methacrylate may be used in substitution for the methyl acrylate in whole or in part. Other cross linking molecules can be substituted for diallyl maleate, such as diallyl phthalate, diallyl oxalate, polyester resin condensates of maleic acid and various glycols, and divinyl benzene.

The powdered metals and oxides should be of minimum particle size, in order to introduce a maximum of catalyst area per unit of weight. Cobalt powder whose particle size was 5 micron or less was used in Example I. Using cobalt whose particle size is 25 micron or less, it requires about 4 weight percent catalyst instead of 2 weight percent to maintain the same burning rate.

The following additional specific examples are given of slow burning, combustible, cast compositions of matter adaptable to production by my method.

The monomer mixture 4 is then introduced and the cloth thoroughly wetted to displace the entrapped air. The oxidizer-catalyst mixture 5 is poured in and stirred well. The subsequent process then follows the procedures of Example I accounting for the additional weight of monomer impregnating the glass cloth. All air is displaced from the glass cloth liner, as any residual oxygen entrapped acts as a very effective inhibitor for the methyl acrylate polymerization, resulting in a poorly laminated liner.

Since the monomer is very fluid, it readily penetrates the cloth, while the oxidizer particles remain inside the cloth liner 1. The cloth thus acts as a semipermeable membrane. As shown in FIG. 3, the resulting polymerized casting or propellant charge comprises an outer layer 6 of resin, a resin filled glass-cloth laminated intermediate portion 7, and an inner cast oxidizer-catalyst and resin mixture 8 all bonded together by the same resin.

Propellant charges constructed as specified above

TABLE I

| Sample No. | Composition (wt. %) | | | | | | Burning Rate (in./sec) 1500 psia |
|---|---|---|---|---|---|---|---|
| | $NH_4NO_3$ | Catalyst | | Resin | | | |
| 1 | 70.5 | Co | 6.4 | methyl acrylate | 70 pt | 23.1 | 0.0856 |
| | | | | diallyl maleate | 20 pt | | |
| | | | | maleic anhydride | 10 pt | | |
| 2 | 70.5 | Ni | 5.8 | Same as above | | 23.7 | 0.0725 |
| 3 | 69.5 | Ni[1] | 6.3 | Same as above | | 24.2 | 0.0819 |
| 4 | 71.2 | Zr—Co[2] | 5.3 | Same as above | | 23.5 | 0.0852 |
| 5 | 71.9 | Zr—Ni[3] | 4.4 | Same as above | | 23.7 | 0.0792 |
| 6 | 67.3 | Zr $H_2$ | 9.4 | Same as above | | 23.3 | 0.0880 |
| 7 | 75.0 | $Co_2O_3$ | 2.0 | methyl acrylate | 80 pt | 23.0 | 0.107 |
| | | | | diallyl maleate | 10 pt | | |
| | | | | maleic anhydride | 10 pt | | |
| 8 | 74.6 | Co | 4.5 | butyl methacrylate | 90 pt | 20.9 | 0.0615 |
| | | | | maleic anhydride | 10 pt | | |
| 9 | 75.3 | Co | 4.7 | styrene | 85 pt | | |
| | | | | maleic acid-propylene glycol polyester | 15 pt | 20.0 | 0.0748 |

[1]Activated Raney nickel
[2]50 wt % Zr and 50 wt % Co
[3]50 wt % Zr and 50 wt % Ni The burning rates in the above table are measured on strands of the cast propellant enclosed in a nitrogen atmosphere at 1500 psia. The strands are restricted to end burning combustion by the use of a suitable varnish film.

Samples of the ammonium nitrate solid propellant castings have been held for a period of 24 hours at −40° F., then directly transferred to a temperature of 160° F. for a second period of 24 hours. One such set of temperature conditioning periods constituted a cycle. The castings have been cycled at least six times, been sectioned, and examined for macroscopic cracks. No cracks were visible. Cycled charges have been fired in test motors without any difficulty, further indicating the absence of cracks in the propellant charges.

It is desirable to prevent some surfaces of the solid propellant from burning, in order to maintain a predetermined burning area. I have discovered an improved means and method of restricting the surface of these cast solid propellants against burning which utilizes woven glass cloth. An example of the method follows: Two layers of tightly woven glass cloth are sewn into a cylinder 1 as shown in the drawings. One end 2 is also closed by glass cloth. The cylinder is fitted into a flat bottom steel mold 3. The glass cloth form is best sewn on a mandrel of such dimensions as to give a tight fit in the mold.

have been successfully burned in a rocket motor, and the restrictive glass cloth liner has withstood up to 4 minutes exposure to the heat and flame thus produced. Glass cloth has high tensile strength and the laminate protects the propellant from mechanical abuse. Since the cloth is noncombustible, the danger of partially decomposed portions clogging the nozzle on ejection is minimized, for the casing remains intact.

An integrally cast restrictor of glass cloth may also be used with other oxidizers and resin fuels. The same restrictor was used to prepare hydrazine nitrate castings, using an 80% methyl acrylate—20% diallyl maleate resin as fuel. Other fuels may be used. For example, the more viscous polymerizable polyester type of resin may be used to coat layers of the cloth which are then laid in the mold and held together on the mold surface by their tackiness. The casting procedure is continued as previously outlined or a viscous mixture of oxidizer and polyester type fuel may be employed. The restrictant is then cured together with the propellant, providing the resin impregnant in the cloth and the resin in the oxidizer mixture copolymerize to form a satisfactory bond at the liner-propellant interface.

While the particular embodiment of the present invention has been shown and described, it will be obvious to those skilled in the art, that changes and modifications may be made without departing from this invention in its broader aspects, and therefore the aim in the abandoned claims is to cover all such changes and modifications as fall in the true spirit and scope of this invention.

I claim:

1. A cast, combustible composition comprising: granular ammonium nitrate; catalytic amounts of a powdered combustion catalyst intimately mixed with the ammonium nitrate, said catalyst being selected from the group consisting of zirconium hydride, cobalt, nickel, alloys of cobalt, nickel, and zirconium, and the oxides of cobalt and nickel; and an elastic, combustible, crosslinked, resinous fuel consisting of a copolymer which is preponderantly methyl acrylate in sufficient amount to fill the voids between the granules of ammonium nitrate and catalyst.

2. A cast, combustible composition comprising: granular ammonium nitrate; catalytic amounts of a powdered combustion catalyst intimately mixed with the ammonium nitrate, said catalyst being selected from the group consisting of cobalt, nickel, alloys of cobalt and nickel, and oxides of cobalt and nickel; and an elastic, combustible, crosslinked, resinous fuel consisting of a copolymer which is preponderantly methyl acrylate in sufficient amount to fill the voids between the granules of ammonium nitrate and catalyst.

3. A cast, combustible composition comprising: 65 to 80 parts of granular ammonium nitrate; 1 to 10 parts of a powdered combustion catalyst intimately mixed with the ammonium nitrate, said catalyst being selected from the group consisting of zirconium hydride, cobalt, nickel, alloys of cobalt, nickel, and zirconium, and oxides of cobalt and nickel; and 20 to 35 parts of an elastic, combustible, crosslinked, resinous fuel comprising predominantly a copolymer of 60 to 100 parts methyl acrylate.

4. A cast, combustible composition comprising: 65 to 80 parts of granular ammonium nitrate; 1 to 10 parts of a powdered combustion catalyst intimately mixed with the ammonium nitrate, said catalyst being selected from the group consisting of cobalt, nickel, alloys of cobalt and nickel, and the oxides of cobalt and nickel; and 20 to 35 parts of an elastic, combustible, crosslinked, resinous fuel comprising pertinently a copolymer of 60 to 100 parts methyl acrylate.

5. A cast, combustible composition comprising: 65 to 80 parts of granular ammonium nitrate; 1 to 10 parts of a powdered combustion catalyst intimately mixed with the ammonium nitrate, said catalyst being selected from the group consisting of cobalt, nickel, alloys of cobalt and nickel, and the oxides of cobalt and nickel; and 20 to 35 parts of an elastic, combustible, resinous fuel consisting of a copolymer of 60 to 100 parts of methyl acrylate, and 1 to 20 parts of maleic anhydride.

6. A method of casting in situ a solid propellant composition, characterized by: providing a mold and internal liner therein, the liner being permeable to a resin forming solution; bringing together within said liner a mixture of granular oxidizer and a resin forming solution of low viscosity; stirring the mixture; allowing the granular particles of oxidizer to settle, and the resin former to permeate said liner; removing excess resin former solution until the amount of resin former within said liner is approximately sufficient to fill the voids between the granular particles of oxidizer; and polymerizing the resin former in situ to form an elastic, combustible casting.

7. A method of preparing a cast, solid, combustible composition comprising: intimately mixing granular ammonium nitrate with catalytic amounts of a powdered combustion catalyst; further bringing together in a mold the mixture of ammonium nitrate and catalyst with a resin forming solution of low viscosity, whose volume is sufficient to form a stirrable slurry; stirring the whole; allowing the solid particles to settle; removing excess resin forming solution until the amount of resin former is approximately sufficient to fill the voids between the solid particles; and polymerizing the resin former in situ to form an elastic combustible casting.

8. In the method of claim 7, the additional step of inserting a glass-cloth, shaped container into the mold contiguously to surfaces of the mold and previous to mixing components in the mold.

9. A solid propellant structure, comprising: a propellant body including a granular oxidizer and a polymerized resin; and a foraminous liner permeable to said resin prior to polymerization and impregnated therewith but impermeable to said granular oxidizer.

10. A solid propellant structure, comprising: a propellant body including a granular oxidizer and a polymerized resin; a foraminous liner impregnated with said resin but free of said oxidizer; and a covering of resin on the exterior surface of said liner.

* * * * *